April 5, 1932.  W. E. WOLLHEIM  1,852,069
FLASH IGNITER
Filed May 16, 1930
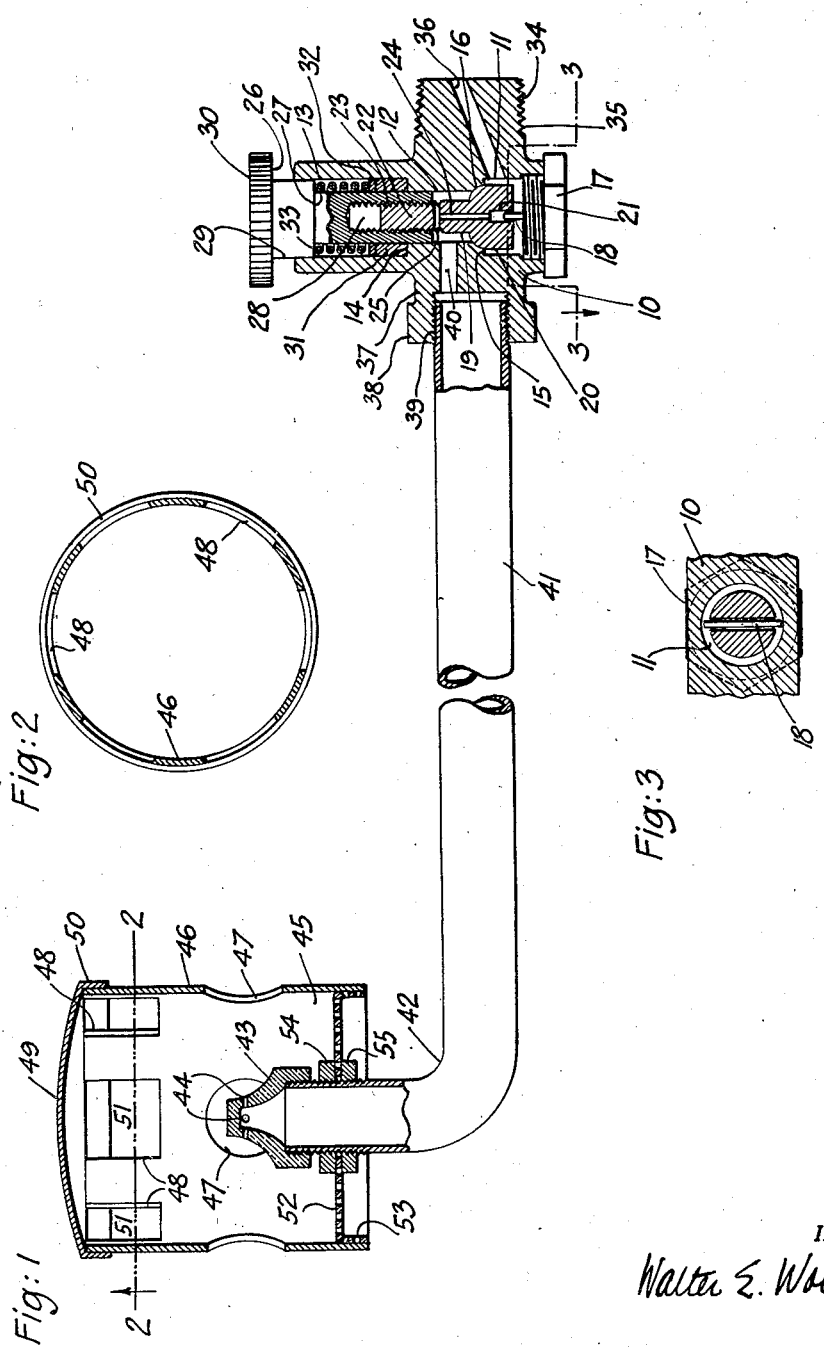
INVENTOR:
Walter E. Wollheim Patented Apr. 5, 1932

1,852,069

UNITED STATES PATENT OFFICE

WALTER E. WOLLHEIM, OF NEW YORK, N. Y., ASSIGNOR TO CHARLES F. LARSEN, OF NEW YORK, N. Y.

FLASH IGNITER

Application filed May 16, 1930. Serial No. 452,914.

This invention relates to flash igniters for gas stoves, and has for one of its particular objects the provision of a simple and effective operating valve in combination with such a device which is capable of admitting a small constant supply of gas for a pilot light and a relatively large supply of gas for igniting purposes. Another object is to eliminate in a valve casing of this kind the usual by-pass ducts and adjustable screw attachment for regulating the amount of gas admitted to the pilot by embodying in the valve member itself the adjustable means for admitting the gas to the pilot. A further object is to provide a simple and easily manufactured hood over the pilot light. Still further objects of the invention will become apparent as the nature of the invention is better understood.

In the drawings;

Fig. 1 is a longitudinal sectional view, partly in elevation, of a flash igniter as furnished ready for attachment to gas stoves;

Fig. 2 is a horizontal sectional view along the plane of line 2—2 in Fig. 1; and Fig. 3 is a similar sectional view along the plane of line 3—3 in Fig. 1.

Like characters of reference denote similar parts throughout the several views and the following specification.

10 is a valve casing, bored out transversely with a large bore 11 at its bottom, a smaller bore 12 in its center, and a little larger bore 13 at its top, forming a shoulder 14, between bores 12 and 13, and a shoulder 15 and a valve seat 16 between bores 11 and 12. The end of bore 11 adjacent the bottom of the casing 10 is threaded to receive a cap 17 which is provided with a polygonal flange to seat tightly against the bottom of the casing, and at its inner face with a flat extension 18.

19 is a valve member having a head 20, the end of which is slotted at 21 to loosely engage the flat extension 18. The opposite end of the head is ball shaped to fit against valve seat 16. 22 is a valve stem threaded exteriorly at 23. 24 is a by-pass drilled longitudinally of the valve stem, and 25 are transverse bores through the stem in communication with the by-pass 24.

26 is an operating member for the valve, substantially cylindrical in shape having its lower smaller end 27 snugly and slidingly engaging the small center bore 12 of the valve casing 10, and also having an inner central tapped hole 28 to loosely fit over the threaded end 23 of the valve stem. 29 is a slightly larger part of the operating member, slidingly fitted within the larger top bore 13 of the casing. 30 is a circular head of the operating member, preferably knurled on its sides.

31 is a suitable packing ring around the cylindrical end 27 of the operating member, and 32 a metal washer over this ring. 33 is a metal compression spring positioned between the washer 32 and the shoulder formed between part 29 and part 27 of the operating member.

The valve casing 10 is provided at one side, at substantially right angles with the valve stem, with a shank 34, threaded exteriorly at 35 to be screwed into a gas supply pipe. 36 is a duct through shank 34 terminating in the large bottom bore 11 of the casing 10. The opposite side of the valve casing 10 is provided with an extension 37, having a polygonal section 38 adjacent its end, a tapped opening 39 and a duct 40 connecting with the small center bore 12 of the casing.

Screwed into the tapped opening 39 of the valve casing 10 and in communication with duct 40 is a gas pipe 41, which has its other end curved upwardly at 42 and threaded. 43 is a gas tip, preferably made of lava, screwed upon the end 42 of the pipe. 44 are small horizontal cross bores in the end of the tip and in communication with the pipe 41.

45 is a hood over the gas tip 43, consisting of a cylindrical shell 46, preferably made of standard tubing, having a plurality of firing ports 47 in horizontal alignment with the bores 44 of the gas tip. At 48 a number of portions of metal have been cut away at the upper edge of the shell 46. 49 is a dome-shaped top, having a depending circular flange 50, which is placed over the top edge of the shell 46, thus forming therewith a number of vent openings 51. The bottom of the shell is closed by a plate 52 of perforated sheet metal having a depending circular flange 53 which is forced into the bottom of the shell. The center of the plate 52 is provided with a round aperture to permit the gas pipe 41 to be pushed therethrough. 54 and 55 are lock nuts for fastening the plate 52 and thus the entire hood 45 to the gas pipe and over its tip.

The operation of my device is as follows:

The device is applied to a gas stove in the usual well-known manner by screwing the shank 34 of the valve casing 10 into the gas supply pipe of the gas stove and positioning the hood 45 about equally spaced from the gas burners the device is to ignite. In the normal position, shown in Fig. 1, gas flows through the duct 36 of the shank 34, into the bottom bore 11, and then through by-pass 24 and 25 of the valve stem 22, into the center bore 12, and thence, through duct 40 into the gas pipe 41. Only a small supply of gas can thus pass into the pipe 41 because of the small size of the by-pass 24 and 25. This supply of gas issues out of the openings 44 of the gas tip 43 and there burns as a small pilot light.

If it is desired to use the device for igniting any or all of the gas burners of the stove to which it is attached, it is only necessary to press down upon the head 30 of the valve operating member 26. This compresses the spring 33, and the lower part 27 of the member 26, in threaded engagement with the valve member 19, pushes the same downwardly and thus moves its head 20 away from its seat and admits a large quantity of gas to enter directly through the center bore 12 into the gas pipe 41. This larger supply of gas shoots out of the openings of the gas tip and is projected in small burning jets towards the burners through firing ports 47 in alignment with each jet thus igniting the burners. Sufficient air is drawn into the hood 45 through vent openings 51 at its top and through the perforated sheet bottom. After the burners have been ignited, the pressure upon the head of the operating member 26 is released and the spring 33 forces the member 26 again back to its normal position which permits only a small amount of gas to pass through the by-passes 24 and 25 for pilot light purposes only. It is obvious that the spring is protected from the corrosive action of gas by the packing 31 and that this also stops the leakage of any gas past the operating member.

In many cases it is necessary to adjust the intensity of the pilot light to suit various gas pressures and to suit various local conditions. To do so, it is only necessary to slightly rotate the head 30 of the member 26 to the right. This screws down the member 26 upon the stem 22 of the valve member 19, and the bottom face of the lower smaller end 27 of the operating member 26 will correspondingly decrease the outlet of by-pass 25 through the stem, thus reducing the amount of gas permitted to pass through it. The size of by-pass 25 is, of course, made so as to allow a maximum amount of gas to pass through it which can then be reduced as just explained. The function of the flat extension 18 of the bottom cap 17 serves merely to engage a corresponding slot in the head of the valve 19 to prevent the same from turning when adjusting the pilot light by screwing down the operating member 26 onto the valve stem 22. This method of adjusting the pilot light eliminates the usual by-pass screw on valve casings as made heretofore and the drilling of the by-passes into the valve casing itself, and thus provides a construction much simpler and more economical to manufacture than former ones. The construction of the hood is such that standard tubing can be used for its shell, standard perforated sheet metal for its bottom, and the vent openings milled out of its top edge, all of which are operations very easily performed and which save the employment of costly stamping dies and the like.

It is obvious that various changes of form, proportion, minor details and combination of parts may be resorted to without departing or sacrificing any of the advantages of the invention, as defined in the appended claims.

What I claim as new, is:

1. A flash igniter for gas stoves having an operating valve fastened to a gas supply pipe, a tube having one end connected to the said valve, a gas tip having transversely disposed outlets secured to the other end of the said tube, and a hood over the said tip, the said hood comprising a cylindrical shell having firing ports in alignment with the outlet of the said tip and cut-out portions at its top edge, a closed top over the said top edge forming vent openings with the said cut-out portions, and a perforated bottom pressed into the said shell and fastened to the said tube below the gas tip.

2. A flash igniter as described in claim 1 in which the said closed top and perforated bottom are detachably connected to the said shell.

3. An operating valve structure for a flash igniter for gas stoves comprising a valve casing, a valve adapted to control a large supply of gas having a stem, an operating member engaging the said stem, resilient means in operable connection with the said member adapted to keep the said valve in a closed position, the said valve stem having a by-pass for the passage of a small supply of gas while the said valve is closed, and means to adjust the outlet of the said by-pass by varying the relation between the said operating member and said valve stem.

4. An operating valve structure as described in claim 3, in which the said operating member and the said valve stem are in threaded engagement.

5. An operating valve structure as described in claim 3, in which the said casing has means to prevent the said valve from rotating.

6. An operating valve structure for flash igniters for gas stoves comprising a valve casing, a reciprocating valve member having a by-pass, an operating member engaging the said valve member and adapted to be reciprocated in unison therewith, the said valve member controlling the lighting flame of the igniter, and the said operating member, by adjustably restricting the said by-pass, controlling the pilot flame.

7. An operating valve structure for flash igniters for gas stoves comprising a valve casing, a reciprocating valve member having a by-pass, an operating member in screw threaded engagement with the said valve member, the said valve member controlling the lighting flame of the igniter, and the said operating member, by adjustable restriction of the said by-pass, controlling the pilot flame.

8. An operating valve structure for flash igniters for gas stoves comprising a valve casing, a reciprocating valve member, means to prevent rotation of the said valve member, an operating member engaging the said valve member adapted to be reciprocated therewith, the said valve member controlling the lighting flame of the igniter, and the said operating member, by rotation, adjusting the said by-pass for the purpose of controlling the pilot flame.

9. An operating valve structure for flash igniters for gas stoves comprising a valve casing, a reciprocating valve member, a plug secured to the said casing having means to prevent rotation of the said valve member, an operating member engaging the said valve member adapted to be reciprocated therewith, the said valve member controlling the lighting flame of the igniter, and the said operating member, by adjustment of the said by-pass, controlling the pilot flame.

In testimony whereof I have hereunto set my hand.

WALTER E. WOLLHEIM.